United States Patent Office 3,418,653
Patented Dec. 24, 1968

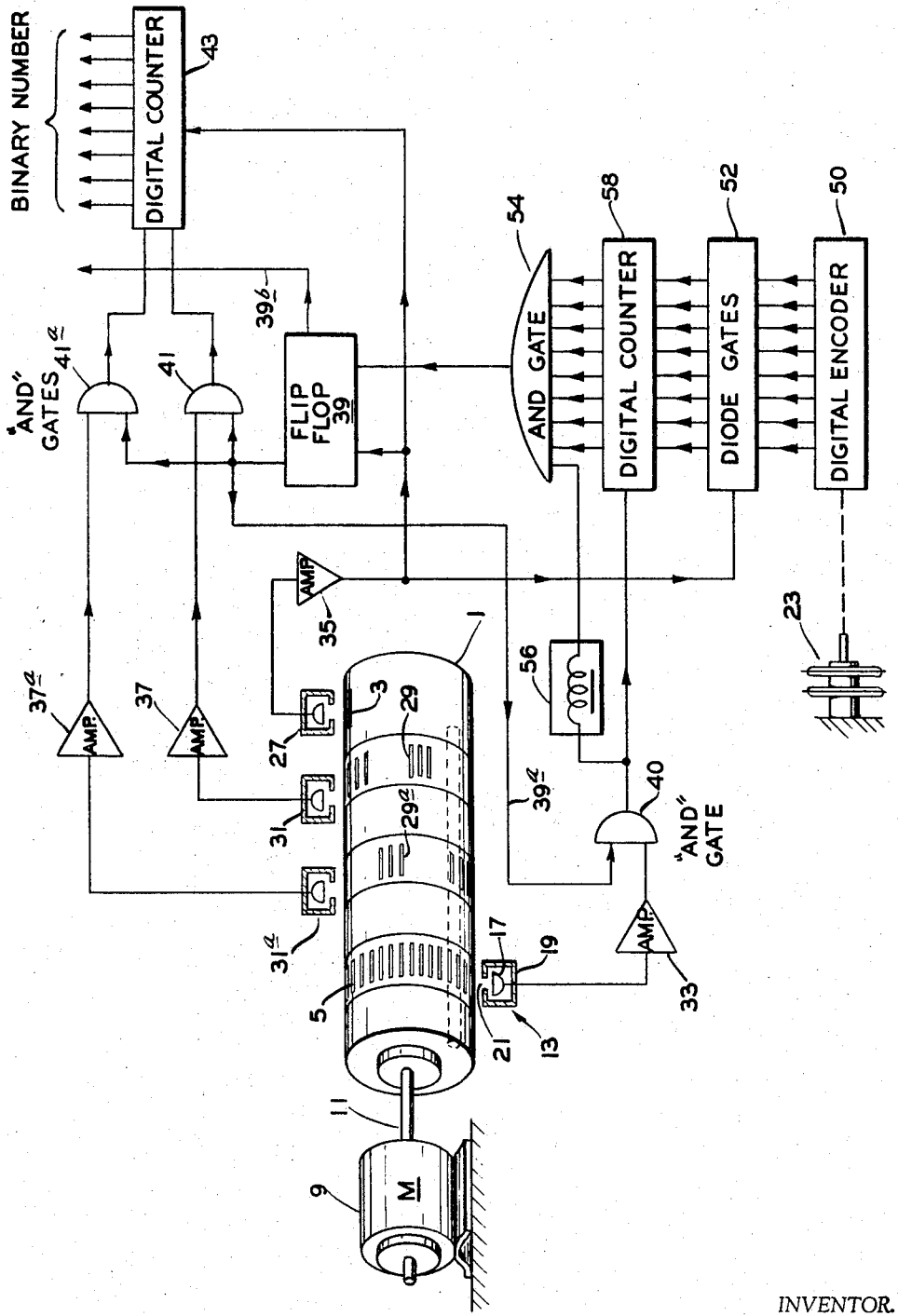

3,418,653
ENCODER
Arthur S. Robinson, South Huntington, N.Y., assignor to
The Bendix Corporation, a corporation of Delaware
Original application Apr. 15, 1959, Ser. No. 806,625, now
Patent No. 3,165,730, dated Jan. 12, 1965. Divided
and this application May 13, 1964, Ser. No. 366,976
18 Claims. (Cl. 340—347)

ABSTRACT OF THE DISCLOSURE

A function encoder has a member with intelligence therein in the form of lines and the member is scanned by pick-up means and provides pulses which are counted by a counter during a preselected interval to provide a count corresponding to a condition according to a preselected function.

The invention relates to encoders and more particularly to analog to digital encoders for converting mechanical displacements to digital numbers. This application is a division of application Ser. No. 806,625, filed Apr. 15, 1959, and now Patent No. 3,165,730.

One object of the invention is to provide an encoder which converts a mechanical displacement to a digital number according to an arbitrary predetermined function of the displacement and which is accurate, compact, light in weight and has a high degree of resolution.

Another object of the invention is to provide an encoder in which the arbitrary functions may both increase and decrease.

Another object is to provide an encoder in which the functions are truly arbitrary and may include steep slopes and discontinuities.

Another object of the invention is to provide an encoder which operates independently of the encoder drive motor speed.

Another object is to provide an encoder which is simple in design and may readily be mass produced.

The invention contemplates a function encoder comprising a member having increment, counting, and reference intelligence thereon, the increment intelligence corresponding to a preselected function which varies in value in accordance with a condition, pickup means for scanning the member and providing increment, counting, and first reference signals, means for preselecting a counting signal in accordance with the condition to provide a second reference signal, and means connected to the pick-up means providing the first reference and increment signals and to the means providing the second reference signal and responsive to the increment signals in the interval between the reference signals and providing an output corresponding to the condition according to the preselected function.

The foregoing and other objects and advantages of the invention will appear more fully hereinafter from a consideration of the detailed description which follows, taken together with the accompanying drawing wherein one embodiment of the invention is illustrated by way of example. It is to be expressly understood, however, that the drawing is for illustration purposes only and is not to be construed as defining the limits of the invention.

The drawing shows a schematic diagram of a novel encoder constructed according to the invention.

The novel encoder shown in the drawing and constructed according to the invention comprises an opaque cylinder 1 having intelligence thereon in the form of short transparent lines including a reference line 3. Increment lines 29 are positioned circumferentially about cylinder 1 and are spaced according to a desired arbitrary preselected function of a variable. If the stored function both increases and decreases incremental lines 29a also are required and correspond to the increments to be subtracted. Each space between the lines corresponds to an incremental increase or decrease in the stored function. If the function is nonlinear, then the lines are unequally spaced. Reference or counting lines 5 are positioned circumferentially about cylinder 1 and are equally spaced.

The interior of the drum may be lighted in any suitable manner so that the lines are illuminated and the remainder of the drum is dark. The cylinder is rotated at relatively high speed by a motor 9 through a shaft 11.

A fixed photo-electric pickup 13 is positioned adjacent cylinder 1 and scans counting lines 5 and provides a counting pulse when a counting line passes the pickup. Pickup 13 may comprise a photo cell 17 enclosed within a shield 19 having a small aperture 21 therein adjacent the cylinder to transmit light from light source 17 to the photo cell when a counting line 5 is coincident with the aperture. Fixed pickups 31 and 31a similar to pickup 13 are positioned adjacent cylinder 1 and scan increment lines 29 and 29a, respectively, and produce an increment pulse when an increment line passes one of the pickups. A fixed pickup 27 similar to pickup 13 is positioned adjacent cylinder 1 and scans reference line 3, and produces a reference pulse when the reference line passes the pickup.

Increment pulses from pickups 31 and 31a are amplified by amplifiers 37 and 37a and are applied to AND gates 41 and 41a, respectively, connected to the input of a digital counter 43. Counting pulses from pickup 13 are amplified by amplifier 33 and are applied to AND gate 40 connected to the input of a digital counter 58 and through a time delay 56 to an AND gate 54. AND gates 40, 41, and 41a are controlled by a flip-flop 39. When the flip-flop is reset the gates are open or conducting and when the flip-flop is set the gates are closed or nonconducting. Reference pulses from pickup 27 are amplified by amplifier 35 and the amplified pulses reset flip-flop 39 and digital counter 43 and open diode gates 52. Flip-flop 39 is set by a delayed counting or reference pulse from a time delay 56 when AND gate 54 is open.

A condition sensor shown as an aneroid 23 to sense air pressure is connected to a digital encoder 50 and provides in the digital encoder a digital number corresponding to the condition. Digital encoder 50 is connected through diode gates 52 to digital counter 58. When diode gates 52 are opened by a reference pulse from pickup 27, digital counter 58 is preset with a digital number corresponding to the digital number on digital encoder 50. AND gate 54 is connected to digital counter 58 and opens only when digital counter 58 reads zero. Counting pulses from pickup 13 applied to digital counter 58 down count the counter to zero. The counting pulse causing the final transition is applied to AND gate 54 through time delay 56 and passes as a reference pulse through AND gate 54 to set flip-flop 39. The setting of flip-flop 39 closes gates 40, 41, and 41a.

The sequence of operation of the encoder is as follows:

A reference pulse from pickup 27 resets flip-flop 39 and this opens gates 40, 41, and 41a. The reference pulse also resets digital counter 43 to zero and opens diode gates 52 so that the digital number on digital encoder 50 is transferred to digital counter 58. This closes AND gate 54. Pulses from pickups 31 and 31a are counted by digital counter 43 and counting pulses from pickup 13 down count digital counter 58. When digital counter 58 is down counted to zero, AND gate 54 opens and the final counting pulse from pickup 13 is applied through time delay 56 and passes as a reference pulse through AND gate 54 to set flip-flop 39. This closes gates 40, 41 and 41a so that no more pulses from pickups 31 and 31a are applied to digital counter 43 and no additional counting pulses from pickup 13 are applied to digital counter 58 in the interval between the reference pulse from AND gate 54 and the reference pulse from pickup 27. During this interval, the output 39b of flip-flop 39 transfers the binary number in digital counter 43 to a device, such as a computer, utilizing this information. A reference pulse from pickup 27 begins another counting period.

Flip-flop circuit 39 may be of the kind shown on p. 47 of "Arithmetic Operation in Digital Computers" by R. K. Richards and published by D. Van Nostrand Co., Inc. AND gates 40, 41, and 41a may be of the kind shown on p. 74, and digital counters 43 and 58 may be of the kind shown on p. 194, respectively, of the above publication.

The encoder described herein and constructed according to the invention converts mechanical displacements to digital numbers according to any arbitrary predetermined function of the displacement and the encoder is accurate, compact, light in weight and has a high degree of resolution. The arbitrary functions may both increase and decrease and may include steep slopes and discontinuities. The encoder operates independently of the encoder drive motor speed and is simple in design and may readily be mass produced.

Instead of using photo-electric pickups responsive to illuminated transparent function lines as described herein, capacitive or inductive sensing may be used by inscribing the reference and function lines as conducting surfaces or as magnetic material and using capacitive or inductive pickups to detect the passage of a line and provide corresponding pulses.

While one embodiment of the invention has been illustrated and described in detail, it is to be expressly understood that the invention is not limited thereto. Various changes may also be made in the design and arrangement of the parts without departing from the spirit and scope of the invention as the same will now be understood by those skilled in the art. While in the embodiment shown the cylinder is rotated and the pickups are stationary, in some instances it may be desirable to rotate the pickup and hold the cylinder stationary or some other arrangement may be used for providing the desired relative movement. Also, while the invention has been described for convenience as counting the increment pulses in the interval between the reference pulse from pickup 27 and the reference pulse from AND gate 54 it should be understood that in some instances it may be desirable to count the increment pulses in the interval between the reference pulse from AND gate 54 and the reference pulse from pickup 27, in which case the pulse from AND gate 54 would start the counting period and a reference pulse from pick-up 27 would end the counting period. Also, a disc bearing suitable intelligence may be used instead of a cylinder.

What is claimed is:

1. A function encoder comprising a member having reference, counting and increment intelligence thereon, the counting intelligence comprising a series of equally spaced lines and the increment intelligence including a series of lines spaced in accordance with a condition according to a preselected function, pickup means for scanning the intelligence to provide reference, counting and increment pulses upon coincidence of the pickup means and the corresponding intelligence, means for preselecting a counting pulse in accordance with the condition to determine the interval between the reference and counting pulses, a counter connected to the pickup means providing increment pulses, and means connected to the pickup means providing reference and counting pulses for applying the increment pulses to the counter only in the interval between the reference and selected counting pulse.

2. A function encoder comprising a member having reference, counting and increment intelligence thereon, the counting intelligence comprising a series of equally spaced lines and the increment intelligence including two series of lines spaced in accordance with a condition according to a preselected function which both increases and decreases, one series of increment lines corresponding to the increase and the other series of increment lines corresponding to the decrease, pickup means for scanning the intelligence to provide reference, increment and counting pulses on coincidence of the pickup means and the corresponding intelligence, means for preselecting a counting pulse in accordance with the condition to vary the interval between the reference and counting pulses, a counter connected to the pickup means providing increment pulses, and means connected to the pickup means providing reference and counting pulses for applying the increment pulses to the counter only in the interval between the reference and selected counting pulse, the increment pulses corresponding to the increase being added in the counter and the increment pulses corresponding to the decrease being subtracted in the counter.

3. A function encoder comprising a member having reference, counting, and increment intelligence thereon, the counting intelligence comprising a series of equally spaced lines and the increment intelligence including a series of lines spaced in accordance with a condition according to a preselected function, pickup means for scanning the intelligence to provide a first reference pulse and counting and increment pulses upon coincidence of the pickup means and the corresponding intelligence, means for preselecting a counting pulse in accordance with the condition to provide a second reference pulse, and means for counting the increment pulses in the interval between the reference pulses.

4. A device as described in claim 3 in which the means for preselecting a counting pulse in accordance with the condition to provide a second reference pulse includes a condition sensor, a digital encoder connected to the condition sensor and providing a digital number corresponding to the condition, gate means controlled by the pickup means providing a first reference pulse, a digital counter connected to the gate means and receiving the digital number on the digital encoder when the gate means is open, and a gate controlled by the digital counter and opened when the count on the digital counter is zero and passing a delayed counting pulse to provide the second reference pulse.

5. A function encoder comprising a member having reference, counting, and increment intelligence thereon, the counting intelligence comprising a series of equally spaced lines and the increment intelligence including a series of lines spaced in accordance with a condition according to a preselected function, pickup means for scanning the intelligence to provide a first reference pulse and counting and increment pulses upon coincidence of the pickup means and the corresponding intelligence, means for preselecting a counting pulse in accordance with the condition to provide a second reference pulse, a counter connected to the pickup means providing increment pulses, and means connected to the pickup means providing a first reference pulse and to the means providing the second reference pulse for applying the increment pulses to the counter only in the interval between the reference pulses.

6. A function encoder comprising a member having increment, counting and reference intelligence thereon, the increment intelligence corresponding to a preselected function which varies in value in accordance with a condition, pickup means for scanning the member and providing increment, counting, and first reference signals, means for preselecting a counting signal in accordance with the condition to provide a second reference signal, and means connected to the pickup means providing the first reference and increment signals and to the means providing the second reference signal and responsive to the increment signals in the interval between the reference signals and providing an output corresponding to the condition according to the preselected function.

7. A device as described in claim 6 in which the means for preselecting a counting signal in accordance with the condition to provide a second reference signal includes a condition sensor, a digital encoder connected to the condition sensor and providing a digital number corresponding to the condition, gate means controlled by the pickup means providing a first reference signal, a digital counter connected to the gate means and receiving the digital number on the digital encoder when the gate means is open, and a gate controlled by the digital counter and opened when the count on the digital counter is a predetermined number and providing the second reference signal.

8. A function encoder comprising a member having increment, counting, and reference intelligence thereon, the increment intelligence corresponding to a preselected function which varies in value in accordance with the condition, pickup means for scanning the member and providing increment, counting, and first reference signals, means providing relative movement between the member and pickup means, means for preselecting a counting signal in accordance with the condition to provide a second reference signal, and means connected to the pickup means providing the first reference and increment signals and to the means providing the second reference signal and responsive to the increment signals in the interval between the reference signals and providing an output corresponding to the condition according to the preselected function.

9. A function encoder comprising a member having increment, counting, and reference intelligence thereon, the increment intelligence varying in accordance with a condition according to a preselected function, pickup means for scanning the intelligence and providing increment, counting, and first reference signals, means responsive to the condition for preselecting a counting signal in accordance with the condition to provide a second reference signal, counting means connected to the pickup means providing increment signals, and means connected to the pickup means providing the first reference signal and to the means providing the second reference signal and controlling the counting means to respond to increment signals in the interval between the reference signals to provide an output corresponding to the condition according to the preselected function.

10. A function encoder as described in claim 9 in which the increment intelligence includes two series of lines spaced in accordance with a preselected function which both increases and decreases, one series of increment lines corresponding to the increase and the other series of increment lines corresponding to the decrease, the increment signals corresponding to the increase being added in the counting means and the increment signals corresponding to the decrease being subtracted in the counting means.

11. A function encoder comprising a member having increment, counting, and reference intelligence thereon, the counting intelligence comprising a series of equally spaced lines and the increment intelligence including a series of lines unequally spaced in accordance with a condition according to a preselected nonlinear function, pickup means for scanning the intelligence and providing increment, counting and first reference pulses, a counter connected to the pickup means providing increment pulses, means responsive to the condition for preselecting a counting pulse in accordance with the condition to provide a second reference pulse, and means connected to the pickup means providing the first reference pulse and to the means providing the second reference pulse for applying the increment pulses to the counter in the interval between the reference pulses.

12. A function encoder comprising a member having increment, counting, and reference intelligence thereon, the increment intelligence varying in value in accordance with a condition according to a preselected function, pickup means for scanning the member and providing increment, counting, and first reference pulses, means responsive to the condition for preselecting a counting pulse in accordance with the condition to provide a second reference pulse, and means connected to the pickup means providing the first reference and increment pulses and to the means providing the second reference pulse and providing an output corresponding to the number of increment pulses in the interval between the reference pulses.

13. A function encoder comprising a member having increment, counting, and reference intelligence thereon, the increment intelligence varying in accordance with a condition according to a preselected function, pickup means for scanning the intelligence and providing increment, counting, and first reference pulses, a counter connected to the pickup means providing increment pulses, means for preselecting a counting pulse in accordance with the condition to provide a second reference pulse, and means connected to the pickup means providing the first reference pulse and to the means providing the second reference pulse for applying the increment pulses to the counter in the interval between the reference pulses.

14. A function encoder as described in claim 13 in which the increment intelligence includes two series of lines spaced in accordance with a preselected function which both increases and decreases, one series of increment lines corresponding to the increase and the other series of increment lines corresponding to the decrease, the increment pulses corresponding to the increase being added in the counter and the increment pulses corresponding to the decrease being subtracted in the counter.

15. A function encoder comprising a member having a reference line and a plurality of equally spaced counting lines thereon, a motor rotating the member, a light source illuminating the lines on the member, a photo-electric pickup responsive to the reference line and providing a pulse each time the reference line passes the pickup, a photo-electric pickup responsive to the counting lines and providing a pulse each time a counting line passes the pickup, means for preselecting a counting pulse in accordance with the condition to provide a second reference pulse, and means for measuring the interval between the pulses.

16. A function encoder as described in claim 15 in which the means for measuring the interval between the pulses includes a series of increment lines on the member varying in accordance with a condition according to a preselected function, and a photo-electric pickup providing a pulse each time an increment line passes the pickup.

17. A function encoder as described in claim 16 which includes a counter and means connected to the pickup responsive to the first reference pulse and to the means for providing the second reference pulse for applying the increment pulses to the counter in the interval between the reference pulses.

18. A function encoder as described in claim 17 in which the means for preselecting a counting pulse in accordance with the condition is controlled by condition sensing means.

References Cited

UNITED STATES PATENTS 3,165,730   1/1965   Robinson _____ 235—61.6 X

DARYL W. COOK, *Primary Examiner.*

U.S. Cl. X.R.

235—61.6